(12) United States Patent
Bach et al.

(10) Patent No.: US 11,698,006 B2
(45) Date of Patent: Jul. 11, 2023

(54) STRUCTURAL ASSEMBLY FOR A GAS TURBINE ENGINE

(71) Applicant: Rolls-Royce Deutschland Ltd & Co KG, Blankenfelde-Mahlow (DE)

(72) Inventors: Bennet Bach, Berlin (DE); Gregory Blake, Berlin (DE); Christoph Laible, Mosbach (DE); Stefan Mittelstädt, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 0 days.

(21) Appl. No.: 17/350,684

(22) Filed: Jun. 17, 2021

(65) Prior Publication Data

US 2021/0404385 A1 Dec. 30, 2021

(30) Foreign Application Priority Data

Jun. 25, 2020 (DE) .......................... 102020116785.7

(51) Int. Cl.
*F01D 25/16* (2006.01)
*F16C 33/60* (2006.01)
*F16C 35/04* (2006.01)

(52) U.S. Cl.
CPC .......... *F01D 25/162* (2013.01); *F16C 33/605* (2013.01); *F16C 35/045* (2013.01);
(Continued)

(58) Field of Classification Search
CPC .. F01D 25/162; F16C 2360/23; F16C 33/581; F16C 33/586; F16C 33/60; F16C 33/605;
(Continued)

(56) References Cited

U.S. PATENT DOCUMENTS 3,915,521 A * 10/1975 Young ..................... F16C 33/60
60/226.1
4,386,812 A 6/1983 Anderson
(Continued)

FOREIGN PATENT DOCUMENTS

DE 102017106664 A1 10/2018
EP 3267089 A1 1/2018

OTHER PUBLICATIONS

German Search Report dated Mar. 29, 2021 from counterpart German Patent Application No. 10 2020 116 785.7.

*Primary Examiner* — Justin D Seabe
(74) *Attorney, Agent, or Firm* — Shuttleworth & Ingersoll, PLC; Timothy J. Klima

(57) ABSTRACT

A structural subassembly which has a bearing which comprises a statically arranged outer ring and a rotatably arranged inner ring, wherein the inner ring is connected for conjoint rotation to a component that is rotatable about a longitudinal axis or said inner ring forms part of such a component, and wherein the longitudinal axis defines an axial direction of the bearing. The structural subassembly furthermore comprises a housing flange of a support structure, to which flange the statically arranged outer ring is connected. Provision is made for the outer ring to be of two-part design, wherein each part of the outer ring has a connecting element which is connected to the housing flange, wherein the housing flange is arranged between the two connecting elements in the axial direction.

15 Claims, 4 Drawing Sheets

(52) U.S. Cl.
CPC ............... *F05D 2220/323* (2013.01); *F05D 2260/40311* (2013.01)

(58) Field of Classification Search
CPC ...... F16C 35/067; F16C 35/06; F16C 35/045; F02C 7/06
See application file for complete search history.

(56) References Cited

U.S. PATENT DOCUMENTS

| | | | |
|---|---|---|---|
| 4,473,309 A | 9/1984 | Box | |
| 8,052,331 B2* | 11/2011 | Katougi | ............... F16C 33/586 384/537 |
| 9,194,432 B2* | 11/2015 | Ashmore | ............ F16C 33/6614 |
| 10,119,465 B2* | 11/2018 | Sheridan | ............... F16H 1/2818 |
| 2017/0081973 A1* | 3/2017 | Swift | ........................ F02C 7/06 |
| 2020/0362917 A1* | 11/2020 | Marunaka | ............. F16C 19/383 |

* cited by examiner

US 11,698,006 B2

STRUCTURAL ASSEMBLY FOR A GAS TURBINE ENGINE

This application claims priority to German Patent Application DE102020116785.7 filed Jun. 25, 2020, the entirety of which is incorporated by reference herein.

The invention relates to a structural subassembly for a gas turbine engine as per the present disclosure.

Bearings in which a statically arranged outer ring of the bearing forms a flange that is connected to a housing flange of a support structure are known.

It is the underlying object of the invention to provide a structural subassembly that has a bearing and allows favorable load transfer from the bearing to a support structure.

This object is achieved by a structural subassembly having features as disclosed herein. Refinements of the invention are also disclosed here.

Accordingly, the invention relates to a structural subassembly which can be part of a gas turbine engine. The structural subassembly comprises a bearing which has a statically arranged outer ring and a rotatably arranged inner ring. The inner ring is connected for conjoint rotation to a component that is rotatable about a longitudinal axis or said inner ring forms part of such a component. In this case, the longitudinal axis of the rotatable component defines an axial direction of the bearing. The bearing furthermore comprises a housing flange of a support structure, wherein the outer ring is connected to the housing flange.

In a structural subassembly of this kind, the invention envisages that the outer ring is of two-part design, wherein each part of the outer ring has a connecting element which is connected to the housing flange, wherein the housing flange is arranged between the two connecting elements in the axial direction.

The invention is based on the concept of providing symmetrical load transfer from the bearing to the support structure in a manner which is as uniform as possible and is largely without bending moments. For this purpose, the housing flange is arranged centrally in the axial direction between two connecting elements formed by two parts of the outer ring. The symmetrical arrangement of the housing flange between the two connecting elements allows uniform load transfer to the support structure and avoids the occurrence and transfer of bending moments which would occur in the case of unilateral connection of the outer ring to the housing flange.

Ideally, the situation is such that the center of mass of the connection between the two connecting elements and the housing flange lies in a plane perpendicular to the longitudinal axis in which the center of mass of the bearing also lies. Any bending moments during load transfer from the bearing to the support structure are thereby avoided.

Another advantage associated with the invention is that, owing to the fact that there is a connecting element of the outer ring secured on both sides of the housing flange, the contact area available for load transfer to the housing flange by friction is increased.

The support structure can be any fixed structure which can accept loads. For example, it is a fixed support structure of a gas turbine engine connected to an engine mounting. In another example, the support structure is a gear box housing arranged in a fixed manner.

The rotatable component to which the inner ring is connected or on which the inner ring is formed is a shaft or a rotating element of a gear box, for example. One embodiment associated therewith can provide for the rotating element to be formed by a planet carrier of a planetary gear box or to be connected to such a planet carrier.

According to one embodiment of the invention, the connecting elements of the two parts of the outer ring are likewise each designed as a flange and are flanged to the housing flange. Particularly effective and large-area connection between the housing flange and the connecting elements is thereby provided.

According to another embodiment, the outer ring is split radially. In this case, the outer ring forms a radially inner ring element and a radially outer ring element, which each form one of the connecting elements.

One embodiment associated therewith provides for the radially inner ring element to form a running surface of the bearing, for the radially outer ring element to adjoin the radially inner ring element radially on the outside, and for the two ring elements to have axial regions in which they overlap in the axial direction. In this case, provision can furthermore be made for the connecting elements to extend radially outward on axially opposite sides of the outer ring from the respective axial regions of the ring elements.

In the case of radial splitting of the outer ring, the radially inner ring element and the radially outer ring element overlap one another in the axial direction. One embodiment associated therewith provides for the radially outer ring element and the radially inner ring element to be connected to one another for conjoint rotation by means of an interference fit.

In another exemplary embodiment, the outer ring is split axially. In this case, the outer ring forms an axially forward ring element and an axially rearward ring element, which each form one of the connecting elements.

One embodiment associated therewith provides for one of the ring elements to form a running surface of the bearing, and for the other ring element to be connected at a distance from the running surface to the one ring element. Provision can furthermore be made for the connecting elements to extend radially outward on axially opposite sides of the outer ring from axial regions of the axially forward ring element and of the axially rearward ring element.

The axially forward ring element and the axially rearward ring element are connected to one another for conjoint rotation, e.g. by means of bolts or the like.

The bearing is a rolling bearing, for example, wherein rolling elements are arranged between the inner ring and the outer ring. However, the invention is not restricted thereto, and, as an alternative, the bearing can be designed as a sliding bearing, for example, wherein an inner surface of the outer ring and an outer surface of the inner ring form the sliding bearing.

Another embodiment provides for the structural subassembly to comprise a planetary gear box, wherein the inner ring is shrunk onto a planet carrier of the planetary gear box or onto an element connected to the planet carrier. The planet carrier can be part of a geared fan gas turbine engine.

In another aspect of the invention, the invention relates to a gas turbine engine having a structural subassembly according to the invention. Provision may be made here for the gas turbine engine to have:

an engine core which comprises a turbine, a compressor and a core shaft connecting the turbine to the compressor and formed as a hollow shaft;
a fan which is positioned upstream of the engine core, wherein the fan comprises a plurality of fan blades; and
a planetary gear box, the input of which is connected to the turbine shaft and the output of which is connected to the fan shaft, wherein the planetary gear box comprises a planet carrier which is supported by a bearing as disclosed herein on a support structure of the gas turbine engine.

One design embodiment in this regard may provide that the turbine is a first turbine, the compressor is a first compressor, and the turbine shaft is a first turbine shaft;

the engine core further comprises a second turbine, a second compressor, and a second turbine shaft which connects the second turbine to the second compressor; and the second turbine, the second compressor, and the second turbine shaft are disposed with a view to rotating at a higher rotational speed than the first turbine shaft.

It is pointed out that the present invention is described with reference to a cylindrical coordinate system which has the coordinates x, r, and φ. Here, x indicates the axial direction, r indicates the radial direction, and φ indicates the angle in the circumferential direction. The axial direction is in this case identical to the machine axis of a gas turbine engine in which the structural subassembly is arranged. Proceeding from the x-axis, the radial direction points radially outward. Terms such as "in front of", "behind", "front", and "rear" refer to the axial direction, or the flow direction in the engine. Terms such as "outer" or "inner" relate to the radial direction.

As noted elsewhere herein, the present disclosure may relate to a gas turbine engine. Such a gas turbine engine may comprise an engine core which comprises a turbine, a combustion chamber, a compressor, and a core shaft that connects the turbine to the compressor. Such a gas turbine engine may comprise a fan (having fan blades) which is positioned upstream of the engine core.

Arrangements of the present disclosure can be particularly, although not exclusively, beneficial for fans that are driven via a gear box. Accordingly, the gas turbine engine may comprise a gear box that receives an input from the core shaft and outputs drive for the fan so as to drive the fan at a lower rotational speed than the core shaft. The input to the gear box may be performed directly from the core shaft or indirectly from the core shaft, for example via a spur shaft and/or a spur gear. The core shaft may be rigidly connected to the turbine and the compressor, such that the turbine and the compressor rotate at the same rotational speed (wherein the fan rotates at a lower rotational speed).

The gas turbine engine as described and/or claimed herein may have any suitable general architecture. For example, the gas turbine engine may have any desired number of shafts, for example one, two or three shafts, that connect turbines and compressors. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft which connects the second turbine to the second compressor. The second turbine, second compressor and second core shaft may be arranged so as to rotate at a higher rotational speed than the first core shaft.

In such an arrangement, the second compressor may be positioned so as to be axially downstream of the first compressor. The second compressor may be arranged so as to receive (for example directly receive, for example via a generally annular duct) flow from the first compressor.

The gear box may be arranged so as to be driven by that core shaft (for example the first core shaft in the example above) which is configured to rotate (for example during use) at the lowest rotational speed. For example, the gear box may be arranged so as to be driven only by that core shaft (for example only by the first core shaft, and not the second core shaft, in the example above) which is configured to rotate (for example during use) at the lowest rotational speed. Alternatively thereto, the gear box may be arranged so as to be driven by one or a plurality of shafts, for example the first and/or the second shaft in the example above.

In the case of a gas turbine engine as described and/or claimed herein, a combustion chamber may be provided axially downstream of the fan and of the compressor(s). For example, the combustion chamber can lie directly downstream of the second compressor (for example at the exit of the latter), if a second compressor is provided. By way of further example, the flow at the exit of the compressor may be supplied to the inlet of the second turbine, if a second turbine is provided. The combustion chamber may be provided upstream of the turbine(s).

The or each compressor (for example the first compressor and the second compressor as described above) may comprise any number of stages, for example multiple stages. Each stage may comprise a row of rotor blades and a row of stator vanes, which may be variable stator vanes (in the sense that the angle of incidence of said variable stator vanes may be variable). The row of rotor blades and the row of stator vanes may be axially offset from one another.

The or each turbine (for example the first turbine and the second turbine as described above) may comprise any number of stages, for example multiple stages. Each stage may comprise a row of rotor blades and a row of stator blades. The row of rotor blades and the row of stator vanes may be axially offset from one another.

Each fan blade may be defined as having a radial span width extending from a root (or a hub) at a radially inner location flowed over by gas, or at a 0% span width position, to a tip at a 100% span width position. The ratio of the radius of the fan blade at the hub to the radius of the fan blade at the tip may be less than (or of the order of): 0.4, 0.39, 0.38, 0.37, 0.36, 0.35, 0.34, 0.33, 0.32, 0.31, 0.3, 0.29, 0.28, 0.27, 0.26 or 0.25. The ratio of the radius of the fan blade at the hub to the radius of the fan blade at the tip may be in an inclusive range delimited by two of the values in the previous sentence (that is to say that the values may form upper or lower limits). These ratios may be referred to in general as the hub-to-tip ratio. The radius at the hub and the radius at the tip can both be measured at the leading periphery part (or the axially frontmost periphery) of the blade. The hub-to-tip ratio refers, of course, to that portion of the fan blade which is flowed over by gas, that is to say the portion that is situated radially outside any platform.

The radius of the fan can be measured between the engine centerline and the tip of the fan blade at the leading periphery of the latter. The diameter of the fan (which can simply be double the radius of the fan) may be larger than (or of the order of): 250 cm (approximately 100 inches), 260 cm, 270 cm (approximately 105 inches), 280 cm (approximately 110 inches), 290 cm (approximately 115 inches), 300 cm (approximately 120 inches), 310 cm, 320 cm (approximately 125 inches), 330 cm (approximately 130 inches), 340 cm (approximately 135 inches), 350 cm, 360 cm (approximately 140 inches), 370 cm (approximately 145 inches), 380 cm (approximately 150 inches), or 390 cm (approximately 155 inches). The fan diameter may be in an inclusive range delimited by two of the values in the previous sentence (that is to say that the values may form upper or lower limits).

The rotational speed of the fan may vary during use. Generally, the rotational speed is lower for fans with a comparatively large diameter. Purely by way of non-limiting example, the rotational speed of the fan under cruise conditions may be less than 2500 rpm, for example less than 2300 rpm. Purely by way of a further non-limiting example, the rotational speed of the fan under cruise conditions for an engine having a fan diameter in the range from 250 cm to 300 cm (for example 250 cm to 280 cm) may also be in the range from 1700 rpm to 2500 rpm, for example in the range from 1800 rpm to 2300 rpm, for example in the range from 1900 rpm to 2100 rpm. Purely by way of a further non-limiting example, the rotational speed of the fan under cruise conditions for an engine having a fan diameter in the range from 320 cm to 380 cm may be in the range from 1200 rpm to 2000 rpm, for example in the range from 1300 rpm to 1800 rpm, for example in the range from 1400 rpm to 1600 rpm.

During use of the gas turbine engine, the fan (with associated fan blades) rotates about an axis of rotation. This rotation results in the tip of the fan blade moving with a velocity Utip. The work done by the fan blades on the flow results in an enthalpy rise dH in the flow. A fan tip loading can be defined as dH/Utip2, where dH is the enthalpy rise (for example the 1-D average enthalpy rise) across the fan and Utip is the (translational) velocity of the fan tip, for example at the leading periphery of the tip (which can be defined as the fan tip radius at the leading periphery multiplied by the angular velocity). The fan tip loading at cruise conditions may be more than (or of the order of): 0.3, 0.31, 0.32, 0.33, 0.34, 0.35, 0.36, 0.37, 0.38, 0.39, or 0.4 (wherein all units in this passage are Jkg−1K−1/(ms−1)2). The fan tip loading may be in an inclusive range delimited by two of the values in the previous sentence (that is to say that the values may form upper or lower limits).

Gas turbine engines in accordance with the present disclosure can have any desired bypass ratio, where the bypass ratio is defined as the ratio of the mass flow rate of the flow through the bypass duct to the mass flow rate of the flow through the core at cruise conditions. In the case of some arrangements, the bypass ratio can be more than (or of the order of): 10, 10.5, 11, 11.5, 12, 12.5, 13, 13.5, 14, 14.5, 15, 15.5, 16, 16.5, or 17. The bypass ratio may be in an inclusive range delimited by two of the values in the previous sentence (that is to say that the values may form upper or lower limits). The bypass duct may be substantially annular. The bypass duct may be situated radially outside the engine core. The radially outer surface of the bypass duct may be defined by an engine nacelle and/or a fan casing.

The overall pressure ratio of a gas turbine engine as described and/or claimed herein can be defined as the ratio of the stagnation pressure upstream of the fan to the stagnation pressure at the exit of the highest pressure compressor (before entry into the combustion chamber). As a non-limiting example, the overall pressure ratio of a gas turbine engine as described and/or claimed herein at cruising speed may be greater than (or of the order of): 35, 40, 45, 50, 55, 60, 65, 70, 75. The overall pressure ratio may be in an inclusive range delimited by two of the values in the previous sentence (that is to say that the values may form upper or lower limits).

The specific thrust of an engine can be defined as the net thrust of the engine divided by the total mass flow through the engine. The specific thrust of an engine as described and/or claimed herein at cruise conditions may be less than (or of the order of): 110 Nkg$^{-1}$s, 105 Nkg$^{-1}$s, 100 Nkg$^{-1}$s, 95 Nkg$^{-1}$s, 90 Nkg$^{-1}$s, 85 Nkg$^{-1}$s or 80 Nkg$^{-1}$s. The specific thrust may be in an inclusive range delimited by two of the values in the previous sentence (that is to say that the values may form upper or lower limits). Such engines can be particularly efficient in comparison with conventional gas turbine engines.

A gas turbine engine as described and/or claimed herein may have any desired maximum thrust. Purely by way of a non-limiting example, a gas turbine as described and/or claimed herein may be capable of generating a maximum thrust of at least (or of the order of): 160 kN, 170 kN, 180 kN, 190 kN, 200 kN, 250 kN, 300 kN, 350 kN, 400 kN, 450 kN, 500 kN, or 550 kN. The maximum thrust may be in an inclusive range delimited by two of the values in the previous sentence (that is to say that the values may form upper or lower limits). The thrust referred to above may be the maximum net thrust at standard atmospheric conditions at sea level plus 15 degrees C. (ambient pressure 101.3 kPa, temperature 30 degrees C.) in the case of a static engine.

During use, the temperature of the flow at the entry to the high-pressure turbine can be particularly high. This temperature, which can be referred to as TET, may be measured at the exit to the combustion chamber, for example directly upstream of the first turbine blade, which in turn can be referred to as a nozzle guide blade. At cruising speed, the TET may be at least (or of the order of): 1400 K, 1450 K, 1500 K, 1550 K, 1600 K, or 1650 K. The TET at constant speed may be in an inclusive range delimited by two of the values in the previous sentence (that is to say that the values may form upper or lower limits). The maximum TET in the use of the engine may be at least (or of the order of), for example: 1700 K, 1750 K, 1800 K, 1850 K, 1900 K, 1950 K, or 2000 K. The maximum TET may be in an inclusive range delimited by two of the values in the previous sentence (that is to say that the values may form upper or lower limits). The maximum TET may occur, for example, under a high thrust condition, for example under a maximum take-off thrust (MTO) condition.

A fan blade and/or an airfoil portion of a fan blade described and/or claimed herein may be manufactured from any suitable material or a combination of materials. For example, at least a part of the fan blade and/or of the airfoil can be manufactured at least in part from a composite, for example a metal matrix composite and/or an organic matrix composite, such as carbon fiber. By way of further example, at least a part of the fan blade and/or of the airfoil can be manufactured at least in part from a metal, such as a titanium-based metal or an aluminum-based material (such as an aluminum-lithium alloy) or a steel-based material. The fan blade may comprise at least two regions which are manufactured using different materials. For example, the fan blade may have a protective leading periphery, which is manufactured using a material that is better able to resist impact (for example of birds, ice, or other material) than the rest of the blade. Such a leading periphery may, for example, be manufactured using titanium or a titanium-based alloy. Thus, purely by way of example, the fan blade may have a carbon-fiber-based or aluminum-based body (such as an aluminum-lithium alloy) with a titanium leading periphery.

A fan as described and/or claimed herein may comprise a central portion, from which the fan blades may extend, for example in a radial direction. The fan blades may be attached to the central portion in any desired manner. For example, each fan blade may comprise a fixing device which can engage with a corresponding slot in the hub (or disk). Purely by way of example, such a fixing device may be in the form of a dovetail that can be inserted into and/or engage with a corresponding slot in the hub/disk in order for the fan blade to be fixed to the hub/disk. By way of further example, the fan blades can be formed integrally with a central portion. Such an arrangement may be referred to as a blisk or a bling. Any suitable method may be used to manufacture such a blisk or such a bling. For example, at least a part of the fan blades can be machined from a block and/or at least a part of the fan blades can be attached to the hub/disk by welding, such as linear friction welding, for example.

The gas turbine engines described and/or claimed herein may or may not be provided with a variable area nozzle (VAN). Such a variable area nozzle can allow the exit cross section of the bypass duct to be varied during use. The general principles of the present disclosure can apply to engines with or without a VAN.

The fan of a gas turbine as described and/or claimed herein may have any desired number of fan blades, for example 16, 18, 20 or 22 fan blades.

As used herein, cruise conditions can mean cruise conditions of an aircraft to which the gas turbine engine is attached. Such cruise conditions can be conventionally defined as the conditions at mid-cruise, for example the conditions experienced by the aircraft and/or the engine between (in terms of time and/or distance) the top of climb and the start of descent.

Purely by way of example, the forward speed at the cruise condition can be any point in the range of from Mach 0.7 to 0.9, for example 0.75 to 0.85, for example 0.76 to 0.84, for example 0.77 to 0.83, for example 0.78 to 0.82, for example 0.79 to 0.81, for example of the order of Mach 0.8, of the order of Mach 0.85 or in the range of from 0.8 to 0.85. Any arbitrary speed within these ranges can be the constant cruise condition. In the case of some aircraft, the constant cruise conditions may be outside these ranges, for example below Mach 0.7 or above Mach 0.9.

Purely by way of example, the cruise conditions may correspond to standard atmospheric conditions at an altitude that is in the range from 10,000 m to 15,000 m, for example in the range from 10,000 m to 12,000 m, for example in the range from 10,400 m to 11,600 m (around 38,000 ft), for example in the range from 10,500 m to 11,500 m, for example in the range from 10,600 m to 11,400 m, for example in the range from 10,700 m (around 35,000 ft) to 11,300 m, for example in the range from 10,800 m to 11,200 m, for example in the range from 10,900 m to 11,100 m, for example of the order of 11,000 m. The cruise conditions may correspond to standard atmospheric conditions at any given altitude in these ranges.

Purely by way of example, the cruise conditions may correspond to the following: a forward Mach number of 0.8; a pressure of 23,000 Pa; and a temperature of −55 degrees C.

As used anywhere herein, "cruising speed" or "cruise conditions" may mean the aerodynamic design point. Such an aerodynamic design point (or ADP) may correspond to the conditions (including, for example, the Mach number, environmental conditions, and thrust requirement) for which the fan operation is designed. This may mean, for example, the conditions under which the fan (or the gas turbine engine) has the optimum efficiency in terms of construction.

In use, a gas turbine engine described and/or claimed herein can operate at the cruise conditions defined elsewhere herein. Such cruise conditions can be determined by the cruise conditions (for example the mid-cruise conditions) of an aircraft to which at least one (for example 2 or 4) gas turbine engine can be fastened in order to provide the thrust force.

It is self-evident to a person skilled in the art that a feature or parameter described in relation to one of the above aspects may be applied to any other aspect, unless these are mutually exclusive. Furthermore, any feature or any parameter described here may be applied to any aspect and/or combined with any other feature or parameter described here, unless these are mutually exclusive.

The invention will be explained in more detail below on the basis of a plurality of exemplary embodiments with reference to the figures of the drawing. In the drawing.

Figure 4:
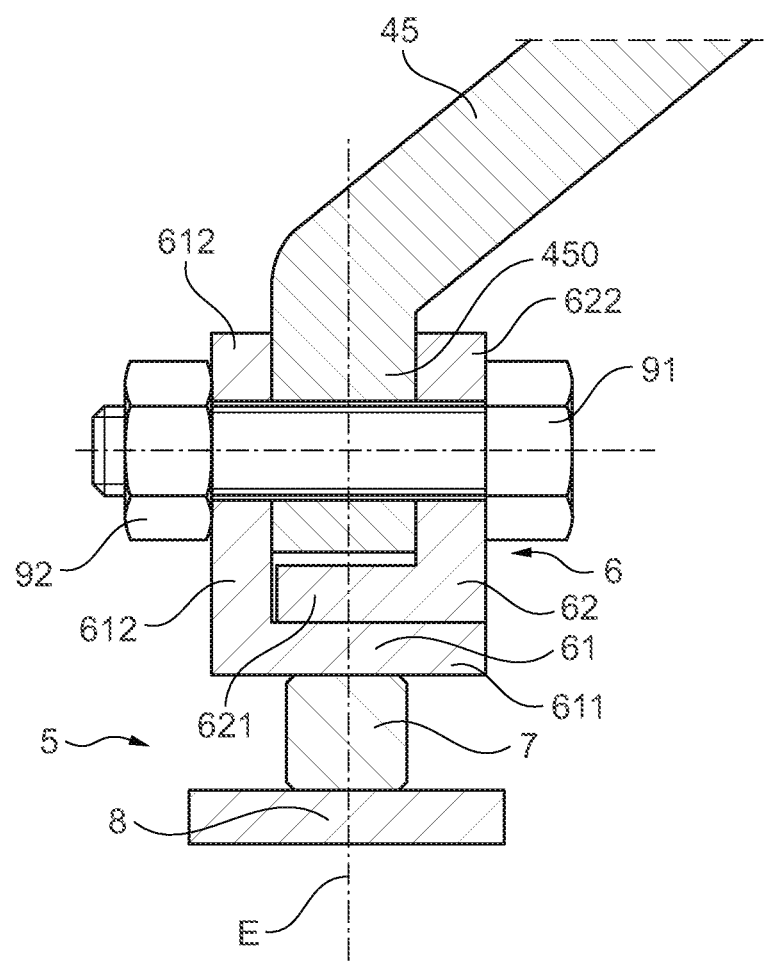
Figure 5:
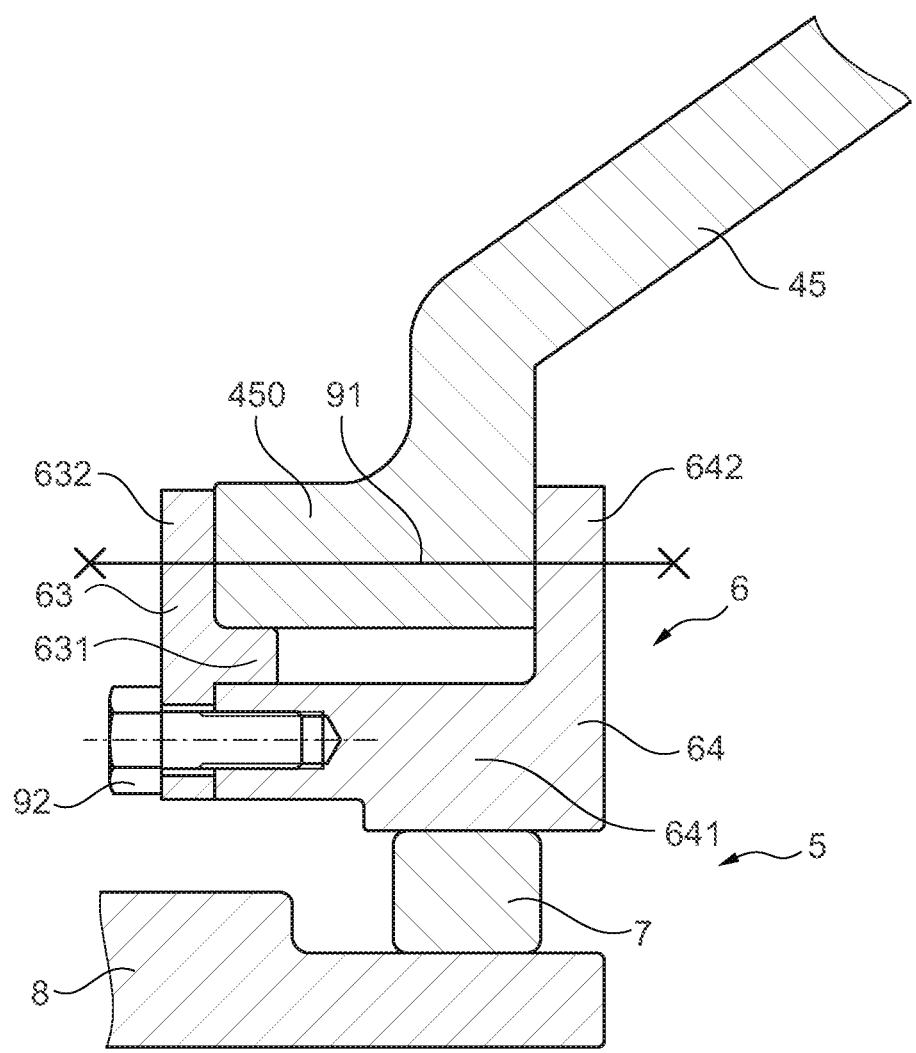

FIG. 4 shows an exemplary embodiment of a structural subassembly which has a bearing having a two-part outer ring, which is connected to a housing flange of a support structure, wherein the outer ring is split radially; and FIG. 5 shows a further exemplary embodiment of a structural subassembly which has a bearing having a two-part outer ring, which is connected to a housing flange of a support structure, wherein the outer ring is split axially.

Figure 1:
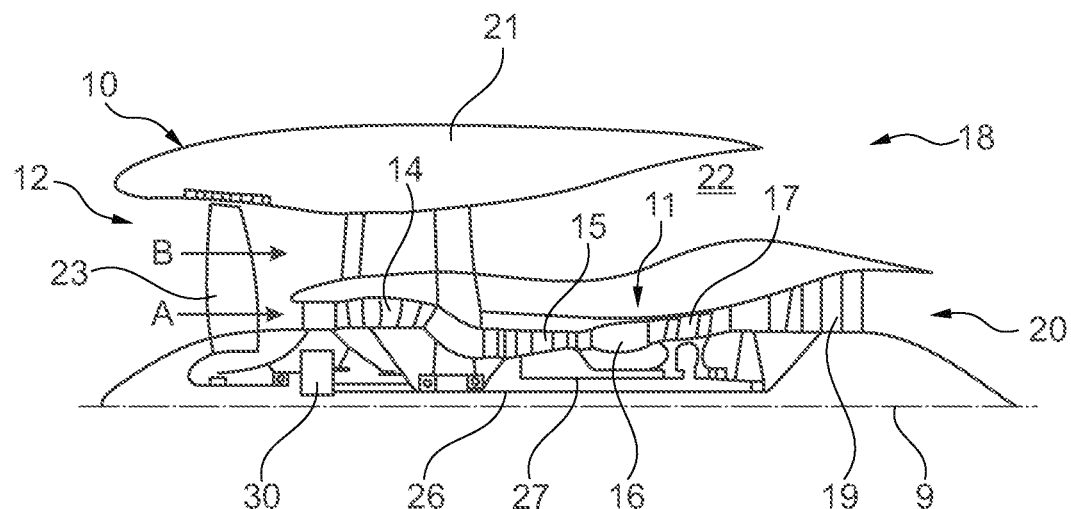
FIG. 1 shows a lateral sectional view of a gas turbine engine.

FIG. 1 illustrates a gas turbine engine 10 having a main axis of rotation 9. The engine 10 comprises an air intake 12 and a thrust fan 23 that generates two air flows: a core air flow A and a bypass air flow B. The gas turbine engine 10 comprises a core 11 which receives the core air flow A. In the sequence of axial flow, the engine core 11 comprises a low-pressure compressor 14, a high-pressure compressor 15, a combustion device 16, a high-pressure turbine 17, a low-pressure turbine 19, and a core thrust nozzle 20. An engine nacelle 21 surrounds the gas turbine engine 10 and defines a bypass duct 22 and a bypass thrust nozzle 18. The bypass air flow B flows through the bypass duct 22. The fan 23 is attached to and driven by the low-pressure turbine 19 by way of a shaft 26 and an epicyclic gear box 30.

During use, the core air flow A is accelerated and compressed by the low-pressure compressor 14 and directed into the high-pressure compressor 15, where further compression takes place. The compressed air expelled from the high-pressure compressor 15 is directed into the combustion device 16, where it is mixed with fuel and the mixture is combusted. The resulting hot combustion products then propagate through the high-pressure and the low-pressure turbines 17, 19 and thereby drive said turbines, before being expelled through the nozzle 20 to provide a certain propulsive thrust. The high-pressure turbine 17 drives the high-pressure compressor 15 by means of a suitable connecting shaft 27. The fan 23 generally provides the major part of the thrust force. The epicyclic gear box 30 is a reduction gear box.

Figure 2:
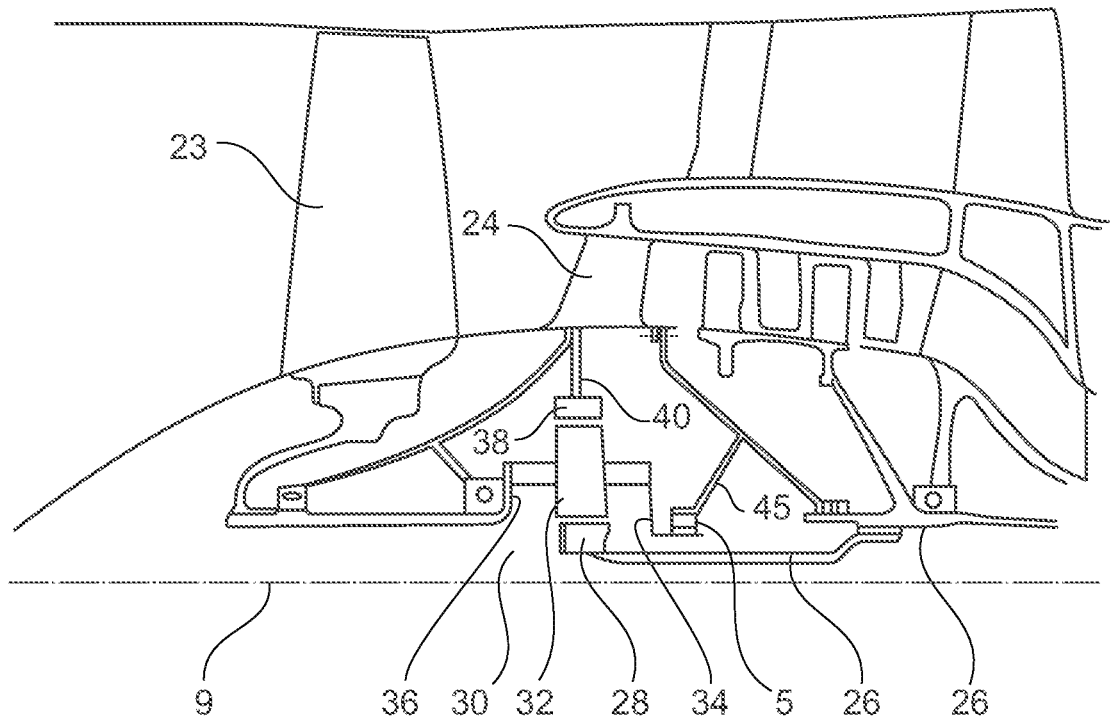
FIG. 2 shows a close-up lateral sectional view of an upstream portion of a gas turbine engine.

An exemplary arrangement for a geared fan gas turbine engine 10 is shown in FIG. 2. The low-pressure turbine 19 (see FIG. 1) drives the shaft 26, which is coupled to a sun gear 28 of the epicyclic gear box assembly 30. Multiple planet gears 32, which are coupled to one another by a planet carrier 34, are situated radially to the outside of the sun gear 28 and mesh therewith. The planet carrier 34 limits the planet gears 32 to orbiting around the sun gear 28 in a synchronous manner while enabling each planet gear 32 to rotate about its own axis. The planet carrier 34 is coupled by way of linkages 36 to the fan 23 so as to drive the rotation of the latter about the engine axis 9. Radially to the outside of the planet gears 32 and meshing therewith is an annulus or ring gear 38 that is coupled, via linkages 40, to a stationary support structure 24.

It is noted that the terms "low-pressure turbine" and "low-pressure compressor" as used herein can be taken to mean the lowest pressure turbine stage and the lowest pressure compressor stage (that is to say not including the fan 23) respectively and/or the turbine and compressor stages that are connected to one another by the connecting shaft 26 with the lowest rotational speed in the engine (that is to say not including the gear box output shaft that drives the fan 23). In some documents, the "low-pressure turbine" and the "low-pressure compressor" referred to herein may alternatively be known as the "intermediate-pressure turbine" and "intermediate-pressure compressor". Where such alternative nomenclature is used, the fan 23 can be referred to as a first compression stage or lowest-pressure compression stage.

Figure 3:
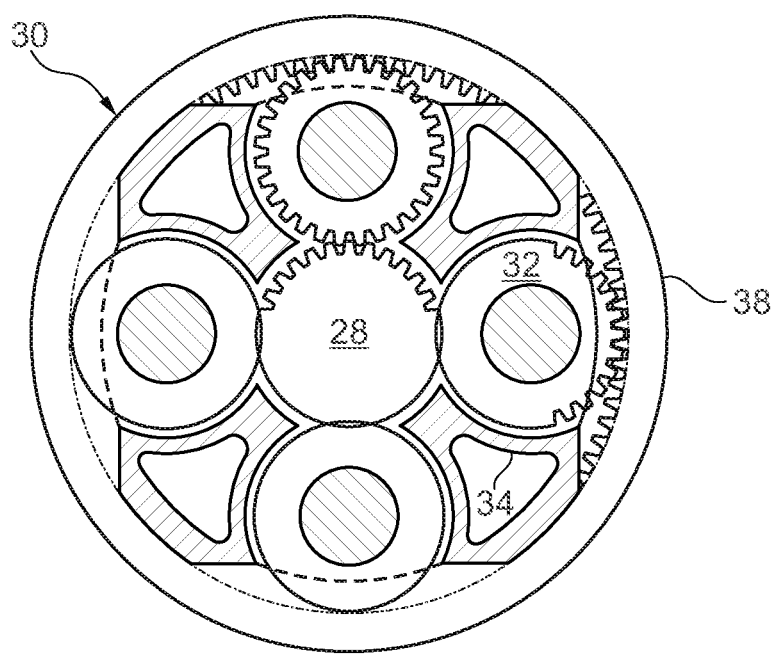
FIG. 3 shows a partially cut-away view of a gear box for a gas turbine engine.

The epicyclic gear box 30 is shown in an exemplary manner in greater detail in FIG. 3. Each of the sun gear 28, the planet gears 32 and the ring gear 38 comprise teeth about their periphery to mesh with the other gears. However, for clarity, only exemplary portions of the teeth are illustrated in FIG. 3. Although four planet gears 32 are illustrated, it will be apparent to the person skilled in the art that more or fewer planet gears 32 may be provided within the scope of protection of the claimed invention. Practical applications of an epicyclic gear box 30 generally comprise at least three planet gears 32.

The epicyclic gear box 30 illustrated by way of example in FIGS. 2 and 3 is a planetary gear box, in that the planet carrier 34 is coupled to an output shaft via linkages 36, wherein the ring gear 38 is fixed. However, any other suitable type of epicyclic gear box 30 can be used. By way of further example, the epicyclic gear box 30 can be a star arrangement, in which the planet carrier 34 is held so as to be fixed, wherein the ring gear (or annulus) 38 is allowed to rotate. In the case of such an arrangement, the fan 23 is driven by the ring gear 38. As a further alternative example, the gear box 30 can be a differential gear box in which both the ring gear 38 and the planet carrier 34 are allowed to rotate.

It will be appreciated that the arrangement shown in FIGS. 2 and 3 is by way of example only, and various alternatives are within the scope of protection of the present disclosure. Purely by way of example, any suitable arrangement can be used for positioning the gear box 30 in the engine 10 and/or for connecting the gear box 30 to the engine 10. By way of a further example, the connections (such as the linkages 36, 40 in the example of FIG. 2) between the gear box 30 and other parts of the engine 10 (such as the input shaft 26, the output shaft and the fixed structure 24) may have a certain degree of stiffness or flexibility. By way of a further example, any suitable arrangement of the bearings between rotating and stationary parts of the engine (for example between the input and output shafts of the gear box and the fixed structures, such as the gear box housing) may be used, and the disclosure is not limited to the exemplary arrangement of FIG. 2. For example, where the gear box 30 has a star arrangement (described above), the person skilled in the art would readily understand that the arrangement of output and support linkages and bearing positions would typically be different to that shown by way of example in FIG. 2.

Accordingly, the present disclosure extends to a gas turbine engine having an arbitrary arrangement of gear box types (for example star-shaped or planetary), support structures, input and output shaft arrangement, and bearing positions.

Optionally, the gear box may drive additional and/or alternative components (e.g. the intermediate-pressure compressor and/or a booster compressor).

Other gas turbine engines in which the present disclosure can be used may have alternative configurations. For example, such engines may have an alternative number of compressors and/or turbines and/or an alternative number of connecting shafts. As a further example, the gas turbine engine shown in FIG. 1 has a split flow nozzle 20, 22, which means that the flow through the bypass duct 22 has a dedicated nozzle, which is separate from the engine core nozzle 20 and is radially on the outside with respect to the latter. However, this is not restrictive, and any aspect of the present disclosure can also apply to engines in which the flow through the bypass duct 22 and the flow through the core 11 are mixed or combined before (or upstream of) a single nozzle, which may be referred to as a mixed flow nozzle. One or both nozzles (whether mixed or split flow) can have a fixed or variable area. Although the example described relates to a turbofan engine, the disclosure can be applied, for example, to any type of gas turbine engine, such as, for example, an open rotor engine (in which the fan stage is not surrounded by an engine nacelle) or a turboprop engine. In some arrangements, the gas turbine engine 10 may not comprise a gear box 30.

The geometry of the gas turbine engine 10, and components thereof, is/are defined by a conventional axis system, comprising an axial direction (which is aligned with the axis of rotation 9), a radial direction (in the bottom-to-top direction in FIG. 1), and a circumferential direction (perpendicular to the view in FIG. 1). The axial, radial and circumferential directions run so as to be mutually perpendicular.

It can be seen in FIG. 2 that the planet carrier 34 is supported on a bearing 5. The bearing 5 has an outer ring, which is supported on a strut or wall structure 45 that is part of a load-bearing support structure of the gas turbine engine. In the context of the present invention, the configuration of the bearing 5 is important. It should be noted here that the following description of the bearing 5 is not restricted to its use in a gas turbine engine in connection with the support of a planetary gear box. In principle, the bearing 5 can be used in any context.

According to the exemplary embodiment in FIG. 4, the bearing 5 comprises a rotating inner ring 8 connected to a rotatable component, a static outer ring 6 and rolling elements 7, which are arranged in between and are designed, for example, as balls or rollers. However, this configuration of the bearing 5 should be understood as being merely by way of example.

The outer ring 6 of the bearing 5 is connected to a support structure 45, which is part of a load-bearing support structure, e.g. of a gas turbine engine. The support structure 45 can be a fixing arm, a strut, a wall or a housing element, for example. For connection of the bearing 5 to the support structure 45, the support structure forms a flange 450, the lateral surfaces of which extend in the radial direction. The flange 450 is referred to below as the housing flange, although, as explained, it is not necessarily part of a housing but of a support structure in general.

The outer ring 6 is of two-part design and comprises a radially inner ring element 61 and a radially outer ring element 62. The radially inner ring element 61 has an axial region 611 and a connecting element 612, which projects perpendicularly from the axial region 611. The radially outer ring element 62 likewise has an axial region 621 and a connecting element 622, which projects perpendicularly from the axial region 621.

With its inner surface, the axial region 611 of the radially inner ring element 61 forms a running surface of the bearing 5. The axial region 621 of the radially outer ring element 62 adjoins the axial region 611 radially on the outside. In this arrangement, provision can be made for axial region 611 and axial region 621 of the two ring elements 61, 62 to be connected to one another for conjoint rotation by an interference fit. As an alternative, a connection for conjoint rotation can be provided by way of positive-locking elements (not illustrated), or a connection is established only indirectly, via the connection of the connecting elements 621, 622 to the housing flange.

The two connecting elements 612, 622 of the two ring elements 61, 62 extend radially outward on axially opposite sides of the outer ring 6. They each form a flange, which is connected to the housing flange 450 by means of bolts 91. Thus, provision is made for the connecting elements 612, 622 to be arranged on both sides of the housing flange 450, and hence for the housing flange 450 to be arranged between the two connecting elements 612, 622 in the axial direction. This ensures that there is uniform load transfer from the bearing 5 to the housing flange 450 and the support structure 45 without bending moments being introduced into the support structure 45.

It is envisaged here that both the center of mass of the connection of the two connecting elements 612, 622 to the housing flange 450 and the center of mass of the bearing 5 lie in the same plane E. Here, the plane E is perpendicular to the axial direction of the bearing 5, which is defined by the axis of rotation of a rotating element to which the inner ring 8 is connected. By arranging both centers of mass in the same plane, the introduction of bending moments or tilting moments into the support structure 45 is avoided. On the other hand, there is such introduction of bending moments if only one connecting element is provided and this is flanged to the housing flange 450 on one side.

FIG. 5 shows an exemplary embodiment of a bearing which differs from the exemplary embodiment in FIG. 4 in that the outer ring 6 is split axially and not split radially as in the exemplary embodiment in FIG. 4.

According to the exemplary embodiment in FIG. 5, the bearing 5 once again comprises a rotating inner ring 8 connected to a rotatable component, a static outer ring 6 and rolling elements 7, which are arranged in between. The bearing 5 is connected to a support structure 45, which is part of a load-bearing support structure, e.g. of a gas turbine engine. For connection of the outer ring 6 of the bearing 5 to the support structure 45, the support structure forms a housing flange 450, the lateral surfaces of which extend in the radial direction.

The outer ring 6 is of two-part design and comprises an axially forward ring element 63 and an axially rearward ring element 64. The axially forward ring element 63 comprises an axial region 631 and a connecting element 632, which projects perpendicularly from the axial region 631. The axially rearward ring element 64 likewise has an axial region 641 and a connecting element 642, which projects perpendicularly from the axial region 641.

On its inner side, the axial region 641 of the axially rearward ring element 64 forms a running surface of the bearing 5. The axially forward ring element 63 is situated axially ahead of the ring element 64. The two ring elements 63, 64 are connected to one another by means of bolts 92.

The two connecting elements 632, 642 of the two ring elements 63, 64 extend on axially opposite sides of the outer ring 6. As in the exemplary embodiment in FIG. 4, they each form a flange that is connected to the housing flange 450 by means of bolts 91, which are illustrated only schematically. The housing flange 450 is thus arranged between the two connecting elements 632, 642 in the axial direction, and therefore there is uniform load transfer from the bearing 5 to the housing flange 450 and the support structure 45, which is substantially free of bending moments. As in the exemplary embodiment in FIG. 4, provision can be made here for the center of mass of the connection of the two connecting elements 632, 642 to the housing flange 450 and the center of mass of the bearing 5 to lie in the same plane E.

It will be understood that the invention is not limited to the embodiments described above, and various modifications and improvements can be made without departing from the concepts described herein. For example, the bearing can be designed as a sliding bearing instead of a rolling bearing.

It should be noted that, except where mutually exclusive, any of the features described can be employed separately or in combination with any other features, and the disclosure extends to and includes all combinations and sub-combinations of one or more features that are described herein. If ranges are defined, said ranges thus comprise all of the values within said ranges as well as all of the partial ranges that lie in a range.

The invention claimed is:

1. A structural subassembly, which has:
a bearing which has a statically arranged outer ring, a rotatably arranged inner ring and a plurality of rolling elements arranged therebetween, wherein the inner ring is at least one chosen from connected for conjoint rotation to a component that is rotatable about a longitudinal axis or is part of the component, wherein the longitudinal axis defines an axial direction of the bearing,
a housing flange of a support structure, the statically arranged outer ring being connected to the housing flange,
the outer ring including a first part and a second part, the first part including a first connecting element connected to the housing flange and the second part including a second connecting element connected to the housing flange, wherein the housing flange is arranged between the first and second connecting elements in the axial direction;
wherein one of the first part and the second part includes an integral axially extending portion having an inner surface engaging the plurality of rolling elements and forming an outer running surface for the plurality of rolling elements.

2. The structural subassembly according to claim 1, wherein the first and second connecting elements are each configured as a flange and are flanged to the housing flange.

3. The structural subassembly according to claim 1, wherein the outer ring is split radially, wherein one of the first part and the second part is a radially inner ring element and the other of the first part and the second part is a radially outer ring element.

4. The structural subassembly according to claim 3, wherein the radially inner ring element forms the outer running surface, the radially outer ring element adjoins the radially inner ring element radially on an outside, and the radially inner and radially outer ring elements have respective axial regions that overlap in the axial direction.

5. The structural subassembly according to claim 4, wherein the first and second connecting elements respectively extend radially outward on axially opposite sides of the outer ring from the respective axial regions.

6. The structural subassembly according to claim 3, wherein the radially outer ring element and the radially inner ring element are connected to one another for conjoint rotation by an interference fit.

7. The structural subassembly according to claim 1, wherein the outer ring is split axially, wherein the outer ring has an axially forward ring element and an axially rearward ring element, the axially forward ring element forming one of the first and second connecting elements and the axially rearward ring element forming the other of the first and second connecting elements.

8. The structural subassembly according to claim 7, wherein one of the axially forward and the axially rearward ring elements includes the running surface of the bearing, and the other of the axially forward and the axially rearward ring elements is connected to the one of the axially forward and the axially rearward ring elements spaced apart at a distance from the running surface.

9. The structural subassembly according to claim 8, wherein the first and second connecting elements respectively extend radially outward on axially opposite sides of the outer ring from axial regions of the axially forward ring element and of the axially rearward ring element.

10. The structural subassembly according to claim 7, and further including a threaded fastener, wherein the axially forward ring element and the axially rearward ring element are connected to one another for conjoint rotation via the threaded fastener.

11. The structural subassembly according to claim 1, wherein a center of mass of the connection between the first and second connecting elements and the housing flange lies in a plane in which a center of mass of the bearing also lies.

12. The structural subassembly according to claim 11, wherein the first part has a first axial width and the second part has a second axial width different from the first axial width, and a radially inner portion of the first part and a radially inner portion of the second part are not symmetrical with one another.

13. The structural subassembly according to claim 1, wherein the inner ring is shrunk onto a planet carrier of a planetary gear box or onto an element connected to the planet carrier.

14. The structural subassembly according to claim 1, wherein the first part has a first axial width and the second part has a second axial width different from the first axial width, and a radially inner portion of the first part and a radially inner portion of the second part are not symmetrical with one another.

15. A gas turbine engine for an aircraft, which has:
an engine core which comprises a turbine, a compressor and a core shaft connecting the turbine to the compressor and formed as a hollow shaft;
a fan, which is positioned upstream of the engine core, wherein the fan comprises a plurality of fan blades and is driven by a fan shaft; and
a planetary gear box, the input of which is connected to the turbine shaft and the output of which is connected to the fan shaft, wherein the planetary gear box comprises a planet carrier which is supported by the structural subassembly according to claim 1 on a support structure of the gas turbine engine.

* * * * *